Patented July 31, 1928.

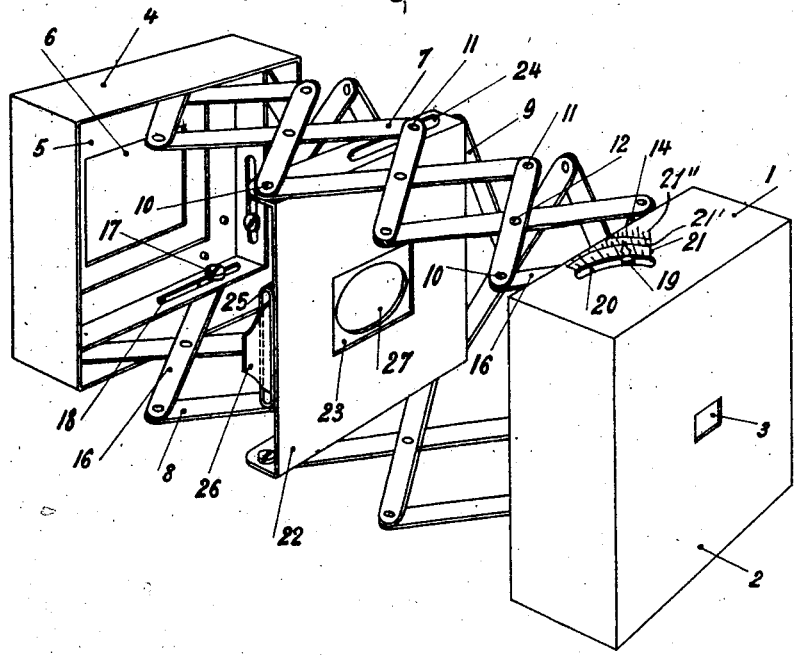

1,678,902

UNITED STATES PATENT OFFICE.

ANDRÉ LÉON VICTOR CLEMENT DEBRIE, OF PARIS, FRANCE.

CAMERA VIEW FINDER.

Application filed September 20, 1926, Serial No. 136,667, and in France December 7, 1925.

It is of advantage for view taking operators to possess a finder whereby they can ascertain before operation which is the most suitable objective. A finder of this kind is also of great use for stage directors, organizers etc. . . . whereby they can follow and constantly supervise the effect obtained.

My invention differs from the adjustable finders commonly used in the art and adapted to be used with an apparatus provided with lenses of different focal lengths by the fact that the frames provided respectively with the eye and view apertures are connected by one or more parallel motions whereby it is collapsible and can thus when folded be put in the operator's pocket. Another important advantage resides in that the effect of the usual apertured screens can be ascertained easily before operation with my improved finder. As well known in the art, such apertured screens are used in view taking apparatus either for providing a sharp limitation of the field in which case they are disposed close to the objective or for providing a blurred limitation of the field in which case they are disposed some distance in front of the objective so as to tone down the borders of the picture. Now the different apertured screens which are to be used subsequently with the view taking apparatus can be tried with my improved finding device. In the case of apertured screens used for sharp delimitation of the field, the effect produced is simply ascertained by closing the remote aperture of the finder in the same ratio to the normal surface of the aperture as the apertured screen to be used stands in relation to the normal opening of the lens in the view taking apparatus. The advantage of my improved finder is apparent when it is desired to ascertain the effect of blurring apertured screens which can be placed in a frame secured to an intermediary point of the parallel motions because, as the ratio of the distances between this intermediary frame and the two extreme frames remains constant to whatever length the device is brought to, the effect obtained by the insertion of this intermediary frame remains the same and corresponds exactly to the effect produced by the same apertured screen placed in the view taking apparatus in a position corresponding to that of the intermediary frame in the finding device.

Moreover my improved finder allows the focal length of the objective required for giving any desired field to be easily determined.

In view of this a projection secured to the extreme end of the parallel motion moves in a slot suitably cut through the frame provided with the finding opening and along which a scale of focal lengths is drawn.

A form of execution of my invention is shown by way of example on appended drawings whereof—

Fig. 1 is a perspective view of the half extended device.

Fig. 2 is a detail plan view of the securing arrangement of a parallel motion to a frame.

The finding device comprises primarily a frame 1 provided with large borders and the bottom 2 of which is provided with a small sight opening 3 and a second similar frame 4 the bottom of which is provided with a rectangular aperture 6. The line joining the centers of 3 and 6 which can be materialized by the crossing of two threads constitutes the line of sight of the apparatus.

The two frames 1 and 4 are connected by a series of parallel motions (three for instance) 7, 8 and 9 the different parts of which are pivotally secured to each other on one hand at their extremities (for instance at 10 and 11) and on the other in their middle (for instance at 12). These parallel motions can be secured to one of the frames 1, for instance, as follows: One of the end links 14 of each parallel motion is pivotally secured at 15 to a flange of the frame 1 and inside the latter whereas the other end link 16 ends with a projection 17 which can slide in a slot 18 borne by the inside of the flange of the frame 1. The parallel motions are secured in a similar manner to the other frame 4.

Besides, the end link 14 of the top parallel motion 7 is provided in its middle with a projection 19 engaging a circular slot 20, the center of which is at 15 and provided in the upper flange of the frame 1. The edge of this slot is provided with a scale 21 giving the focal lengths of the objective to be used.

Between the extremities 11 and 10 of corresponding suitably chosen elements of the several parallel motions is secured a frame 22, whereof the center is apertured at 23, the axis of this aperture being the line of sight passing through the centers of 3 and of 6. The point 10 of one element of each parallel motion is secured to the frame 22 whereas the point 11 of the other element slides in a slot 24 provided in the said frame. The latter is also provided with a lateral slide 25 wherethrough the plate 28 can be made to pass, so as to make the outlined or apertured screen 27 it bears appear in front of the aperture 23.

To use the apparatus, the eye should be applied to the sight aperture 3 and observe the scene to be photographed through the opening 6, the length of the apparatus being adjusted so as to obtain exactly the required field. The scale 21 will give then in front of the projection 19 the focal length of the corresponding objective.

When the apparatus is completely folded, the two frames 1 and 4 come against each other and the bulk of the device is considerably reduced.

If it is desired to reduce the size of the apparatus for a same range of focal lengths, a removable bottom can be used for the frame 4 so as to use at will a bottom provided with an opening of suitable size. Thereby for a same length given to the apparatus, the field varies with the size of the opening 6 used. Of course in this case the slot 20 must be provided with a number of scales 21, 21', 21" corresponding to the several sizes of the opening 6. Moreover it is impossible in such a case to keep the frame 22 which must be done away with.

The removable bottom provided for frame 4 can be used as stated in view of closing the aperture in frame 4 in the same ratio with reference to the normal surface of the said aperture as the apertured screen to be used for a sharp delimitation of the field stands in relation to the normal opening of the lens in the view taking apparatus.

What I claim is:

1. A finding device for the taking of photographic or cinematographic views comprising two frames, one of which is provided with a sight aperture and the other with an opening the size of which is in a given ratio with that of the plate to be used, a series of parallel motions, means whereby the two last links of each extremity of each of these parallel motions are secured to the corresponding frame, the first link being pivotally secured to and the second sliding in a slot provided in the said frame, there being a scale graduated in focal lengths provided on one of the frames and a projection borne by one end link of one parallel motion giving on said scale the focal length of the objective to be used for obtaining the field seen through the two frames, which focal length is proportional to the distance between the two frames.

2. A finding device as claimed in claim 1 provided with an intermediary apertured frame secured to the parallel motions between the two frames and adapted to receive an outlined screen corresponding as to size and position to the one to be used in the view taking apparatus.

3. A finding device as claimed in claim 1 in which the frame carries a number of focal length scales corresponding to varying sizes of the opening of the second mentioned frame.

In testimony whereof I have signed my name to this specification.

ANDRÉ LÉON VICTOR CLEMENT DEBRIE.